United States Patent
Li et al.

(10) Patent No.: US 12,334,732 B2
(45) Date of Patent: Jun. 17, 2025

(54) OFF-GRID START METHOD AND SYSTEM FOR NEW ENERGY POWER GENERATION SYSTEM

(71) Applicant: Sungrow Power Supply Co., Ltd., Hefei (CN)

(72) Inventors: Xing Li, Hefei (CN); Houlai Geng, Hefei (CN); Qun Zheng, Hefei (CN); Menglin Cao, Hefei (CN); Zhifei Zhang, Anhui (CN)

(73) Assignee: Sungrow Power Supply Co., Ltd., Hefei (CN)

( * ) Notice: Subject to any disclaimer, the term of this patent is extended or adjusted under 35 U.S.C. 154(b) by 0 days.

(21) Appl. No.: 18/273,006

(22) PCT Filed: Nov. 8, 2021

(86) PCT No.: PCT/CN2021/129245
§ 371 (c)(1),
(2) Date: Jul. 18, 2023

(87) PCT Pub. No.: WO2022/166289
PCT Pub. Date: Aug. 11, 2022

(65) Prior Publication Data
US 2024/0088656 A1    Mar. 14, 2024

(30) Foreign Application Priority Data
Feb. 3, 2021    (CN) .......................... 202110150471.0

(51) Int. Cl.
*H02J 3/00*       (2006.01)
*H02J 3/18*       (2006.01)
(Continued)

(52) U.S. Cl.
CPC ................ *H02J 3/007* (2020.01); *H02J 3/18* (2013.01); *H02J 3/388* (2020.01); *H02J 3/46* (2013.01); *H02J 2203/10* (2020.01)

(58) Field of Classification Search
CPC .......... Y02E 60/10; Y02E 10/56; H02J 3/007; H02J 3/38; H02J 3/381; H02J 3/46;
(Continued)

(56) References Cited

U.S. PATENT DOCUMENTS

| | | | |
|---|---|---|---|
| 2015/0380942 A1 | 12/2015 | Premm et al. | |
| 2022/0085607 A1* | 3/2022 | Shijo | H02J 3/46 |

FOREIGN PATENT DOCUMENTS

| | | |
|---|---|---|
| CN | 202889244 U | 4/2013 |
| CN | 103178544 A | 6/2013 |

(Continued)

OTHER PUBLICATIONS

International Search Report and Written Opinion for International Application No. PCT/CN2021/129245, mailed Feb. 9, 2022.

(Continued)

*Primary Examiner* — Ryan Johnson
(74) *Attorney, Agent, or Firm* — Wolf, Greenfield & Sacks, P.C.

(57) ABSTRACT

Provided are an off-grid start method and system for a new energy power generation system. The method includes: gradually boosting the voltage of a master according to a plurality of preset voltage given values, and slaves determining, by means of measuring a voltage of the load of a system, a target voltage given value used by the master; and the master determining, by means of monitoring an output current of the master itself, that a slave is successfully connected in parallel, and then continuing to boost the output voltage until all the slaves run in parallel. Therefore, according to the solution, no upper-layer synchronous con- (Continued)

trol is required during a black-start process, and no communication between a master and slaves is required.

9 Claims, 10 Drawing Sheets

(51) Int. Cl.
*H02J 3/38* (2006.01)
*H02J 3/46* (2006.01)

(58) Field of Classification Search
CPC ........ H02J 3/466; H02J 3/472; H02J 2203/10; H02J 3/388; H02J 2300/24; H02J 9/062
See application file for complete search history.

(56) References Cited

FOREIGN PATENT DOCUMENTS

| | | | |
|---|---|---|---|
| CN | 103647305 | A | 3/2014 |
| CN | 106849186 | A | 6/2017 |
| CN | 111130102 | A | 5/2020 |
| CN | 112165243 | A | 1/2021 |
| CN | 112821455 | A | 5/2021 |
| EP | 3 761 472 | A1 | 1/2021 |
| JP | 2006034047 | A * | 2/2006 |

OTHER PUBLICATIONS

Extended European Search Report for European Application No. 21924285.6, dated Dec. 11, 2024.

* cited by examiner

OFF-GRID START METHOD AND SYSTEM FOR NEW ENERGY POWER GENERATION SYSTEM

This application is a national stage filing under 35 U.S.C. § 371 of International Patent Application Serial No. PCT/CN2021/129245, filed Nov. 8, 2021, which claims priority to Chinese Patent Application No. 202110150471.0, titled "OFF-GRID START METHOD AND SYSTEM FOR NEW ENERGY POWER GENERATION SYSTEM", filed on Feb. 3, 2021 with the China National Intellectual Property Administration. The contents of these applications are incorporated herein by reference in their entireties.

FIELD

The present disclosure relates to the technical field of power generation, and in particular to a method for starting a new energy power generation system in an off-grid mode and a new energy power generation system.

BACKGROUND

In order to improve the flexibility of power supply and a load-carrying capacity of a power system, grid-connected operations of new energy power generation systems are widely concerned. In a case that a failure occurs in the public power grid, that is, in a case that a new energy power generation system enters an off-grid mode, it is required to start the new energy power generation system to supply power to a load. The process of a new energy power generation system from not being powered to restarting units and then connecting to or establishing a power grid is referred to as a black starting process.

The conventional black starting process of the new energy power generation system includes a process of synchronously starting a master unit and a slave unit. In the process of synchronously starting the master unit and the slave unit, the master unit and the slave unit may be connected in parallel at a low voltage (or at a 0 voltage), and then the master unit and the slave unit are synchronously boosted to supply power to a load. In the above starting process, a controller is required to receive a signal and to transmit a synchronization signal, so that the master unit and the slave unit can be started synchronously. In addition, it is required to evenly distribute a power to prevent overcurrent of a generator unit (or the power generation system) in the starting process due to uneven power distribution. In the conventional black starting process, the stability of the system depends on the speed of communication. A slower communication indicates that the system has a lower reliability. A faster communication indicates a better synchronization between the master unit and the slave unit and a higher cost.

SUMMARY

In view of this, a method for starting a new energy power generation system in an off-grid mode and a new energy power generation system are provided according to the present disclosure, to realize a black starting process of the system without performing upper level synchronization control and without performing communication between a master unit and a slave unit, and to evenly distribute power between power generation units or power generation subsystems in the black starting process. The technical solutions are described as follows.

In a first aspect, a method for starting a new energy power generation system in an off-grid mode is provided according to the present disclosure. The new energy power generation system includes one master unit and N−1 slave units, where N is a positive integer greater than 1. The master unit is configured with N sequentially increasing predetermined voltages, and an N-th predetermined voltage is a rated predetermined voltage. The method includes: controlling, by the master unit on detecting that a load voltage is less than a predetermined value, an output voltage of the master unit to be gradually increased based on the sequentially increasing predetermined voltages until a voltage stabilization condition is met, where the voltage stabilization condition includes a condition in which the master unit has an overcurrent risk or a condition in which the output voltage of the master unit reaches the rated predetermined voltage; determining, by each of the slave units after detecting that the load voltage is stabilized, a target predetermined voltage of the master unit meeting the voltage stabilization condition based on the stabilized load voltage; starting a target slave unit with the target predetermined voltage as a predetermined voltage, and connecting the target slave unit to the master unit in parallel, where an identification of the target slave unit matches an arrangement number of the target predetermined voltage in the predetermined voltages; and controlling, by the master unit after determining that the target slave unit is successfully connected to the master unit in parallel by detecting an output current of the master unit, the output voltage of the master unit to be gradually increased based on the sequentially increasing predetermined voltages until the voltage stabilization condition is met, until all the slave units are connected to the master unit in parallel and operate.

In an embodiment, the controlling, by the master unit on detecting that a load voltage is less than a predetermined value, an output voltage of the master unit to be gradually increased based on the sequentially increasing predetermined voltages until a voltage stabilization condition is met includes: controlling, by the master unit on detecting that the load voltage is less than the predetermined value, the output voltage of the master unit to be gradually increased based on the predetermined voltages; determining, when a predetermined voltage of the master unit is increased to an i-th predetermined voltage and i is less than N, whether the master unit has an overcurrent risk based on the output current of the master unit, where i is a positive integer, $1 \leq i \leq N$, N represents a total number of the master unit and the slave units, and the N-th predetermined voltage is the rated predetermined voltage; in a case that the master unit has the overcurrent risk, determining that the voltage stabilization condition is met; and in a case the master unit does not have the overcurrent risk, updating the predetermined voltage of the master unit to be an (i+1)th predetermined voltage, and controlling the output voltage of the master unit to be gradually increased based on the predetermined voltages.

In an embodiment, the determining, when a predetermined voltage of the master unit is increased to an i-th predetermined voltage and i is less than N, whether the master unit has an overcurrent risk based on the output current of the master unit includes: determining, when the predetermined voltage of the master unit is increased to the i-th predetermined voltage and i is less than N, whether the output current $I_o$ of the master unit is greater than $i*I_{max}/(i+1)$, where $I_{max}$ represents a maximum current of the master unit; and in a case that $I_o$ is greater than $i*I_{max}/(i+1)$, determining that the master unit has the overcurrent risk, keeping i unchanged, and configuring a voltage clamping flag to be a predetermined clamping character indicating that the predetermined voltage is in a clamped state.

In an embodiment, the master unit determining that the target slave unit is successfully connected to the master unit in parallel by detecting an output current of the master unit includes: determining, by the master unit on detecting that the output current $I_o$ of the master unit is less than or equal to $i*I_{max}/(i+1)$, whether the voltage clamping flag is the predetermined clamping character; in a case that the voltage clamping flag is a predetermined non-clamping character, updating the predetermined voltage of the master unit to be the (i+1)th predetermined voltage, and controlling the output voltage of the master unit to be gradually increased based on the predetermined voltages; and in a case that the voltage clamping flag is the predetermined clamping character, determining that the target slave unit is successfully connected to the master unit in parallel, configuring the voltage clamping flag to be the predetermined non-clamping character after a predetermined time period, updating the predetermined voltage of the master unit to be the (i+1)th predetermined voltage, and controlling the output voltage of the master unit to be gradually increased based on the predetermined voltages.

In an embodiment, the predetermined clamping character is 1 and the predetermined non-clamping character is 0.

In an embodiment, the N predetermined voltages are obtained by N evenly dividing the rated predetermined, the i-th predetermined voltage is equal to $i*V_{rn}/N$, i is a positive integer and $1 \leq i \leq N$, and $V_{rn}$ represents the rated predetermined voltage.

In an embodiment, the determining, by each of the slave units after detecting that the load voltage is stabilized, a target predetermined voltage of the master unit meeting the voltage stabilization condition based on the stabilized load voltage includes: for each of the slave unit, determining, by the slave unit after detecting that a change of the load voltage within a predetermined time period is less than a first voltage threshold, that the load voltage is stabilized; and determining, by the slave unit, a predetermined voltage closest to the stabilized load voltage from the predetermined voltages of the master unit as the target predetermined voltage, where the slave unit stores the predetermined voltages of the master unit.

In an embodiment, the starting the target slave unit with the target predetermined voltage as a predetermined voltage and connecting the target slave unit to the master unit in parallel includes: in a case that the identification of the slave unit matches the arrangement number of the target predetermined voltage in the predetermined voltages of the master unit, determining the slave unit as the target slave unit that meets a starting condition; in a case that the target slave units detects that the target predetermined voltage is not equal to the rated predetermined voltage, obtaining a load voltage $V_{loadre}$, an active current $I_{dre}$ and a voltage drop $V_{Qre}$ caused by an reactive power while the target slave unit is connected to the master unit in parallel and stable; and calculating a predetermined voltage correction value $\Delta V$ by using the following equation based on the load voltage, a real-time active current and the voltage drop caused by the reactive power:

$$\Delta V = k_1(mV_{rn}/N - V_{loadre} - V_{Qre}) + k_1 k_2 V_{Qre}$$

where $mV_{rn}/N$ represents the target predetermined voltage of the master unit, $k_1 = I_d/I_{dre}$, $k_2 = V_{load}/V_{loadre}$, $I_d$ represents the real-time active current, $V_{load}$ represents a real-time load voltage of the new energy power generation system; and updating, by the target salve unit, the predetermined voltage to be $V_{load} + \Delta V$, and controlling, by the target slave unit, a output voltage of the target slave unit based on the updated predetermined voltage.

In an embodiment, the starting the target slave unit with the target predetermined voltage as a predetermined voltage and connecting the target slave unit to the master unit in parallel includes: in a case that the target slave unit detects that the target predetermined voltage is equal to the rated predetermined voltage and at least two slave units are not started, for each of the at least two slave units, starting the slave unit at the rated predetermined voltage after a predetermined time period and connecting the slave unit to the master unit in parallel, where the preset time period matches an identification of the slave unit.

In a second aspect, a new energy power generation system is further provided according to the present disclosure. The system includes one master unit and N−1 slave units, where N is a positive integer greater than 1. The master unit is configured with N sequentially increasing predetermined voltages, and an N-th predetermined voltage is a rated predetermined voltage. The master unit is configured to control, on detecting that a load voltage is less than a predetermined value, an output voltage of the master unit to be gradually increased based on the sequentially increasing predetermined voltages until a voltage stabilization condition is met, where the voltage stabilization condition includes a condition in which the master unit has an overcurrent risk or a condition in which the output voltage of the master unit reaches the rated predetermined voltage. Each of the slave unit is configured to determine, after detecting that the load voltage is stabilized, a target predetermined voltage of the master unit meeting the voltage stabilization condition based on the stabilized load voltage. A target slave unit is configured to be started with the target predetermined voltage as a predetermined voltage and to be connected to the master unit in parallel, where an identification of the target slave unit matches an arrangement number of the target predetermined voltage in the predetermined voltages. The master unit is further configured to, after determining that the target slave unit is successfully connected to the master unit in parallel by detecting an output current of the master unit, control the output voltage of the master unit to be gradually increased based on the sequentially increasing predetermined voltages until the voltage stabilization condition is met, until all the slave units are connected to the master unit in parallel and operate.

A method for starting a new energy power generation system in an off-grid state is provided according to the present disclosure. The new energy power generation system includes one master unit and N−1 slave unit. That is, there are N power generation devices in total. The master unit is configured with N sequentially increasing predetermined voltages, and an N-th predetermined voltage is a rated predetermined voltage. The master unit, on detecting a black starting command, controls an output voltage of the master unit to be gradually increased based on the sequentially increasing predetermined voltages until a voltage stabilization condition is met. The voltage stabilization condition includes a condition in which the master unit has an overcurrent risk or a condition in which the output voltage of the master unit reaches the rated predetermined voltage and a slave unit that is not connected to the master unit in parallel exists. Each of the slave units determines a predetermined voltage, that is, a target predetermined voltage, of the master unit by detecting a load voltage of the system. Only a slave unit (that is, a target slave unit), having an identification matching an arrangement number of the target predetermined voltage in the predetermined voltages, is started with the target predetermined voltage and is connected to the master unit in parallel. It can be seen that the predetermined voltage of the slave unit is controlled to be same as the predetermined voltage of the master unit without performing communication between the master unit and the slave unit, evenly distributing a reactive power. After the master unit determines the target slave unit by detecting the output current of the master unit and is successfully connected to the target slave unit in parallel, the master unit controls the output voltage of the master unit to be continuously increased and the output voltage of the slave unit connected to the master unit in parallel is increased following the master unit until all the slave units are connected to the master unit in parallel. It can be seen that in the present disclosure, it is unnecessary to perform the upper level synchronization control and is unnecessary to perform communication between the master unit and the slave units in the black starting process, reducing the system costs. In addition, in starting the slave units according to the present disclosure, only the slave unit (that is, the target slave unit), having an identification matching an arrangement number of the target predetermined voltage in the N predetermined voltages, is started at the target predetermined voltage and is connected to the master unit in parallel, ensuring that the slave units are started and connected to the master unit in parallel in an order, thereby avoiding that the slave units are started and connected to the master unit in parallel simultaneously.

BRIEF DESCRIPTION OF THE DRAWINGS

In order to more clearly describe the technical solutions in the embodiments of the present disclosure or the technical solutions in the conventional technology, drawings to be used in the description of the embodiments of the present disclosure or the conventional technology are briefly described hereinafter. It is apparent that the drawings described below are merely used for describing the embodiments of the present disclosure, and those skilled in the art may obtain other drawings according to the provided drawings without any creative effort.

DETAILED DESCRIPTION OF EMBODIMENTS

In order to solve the technical problems of requiring upper level synchronization control and high cost in synchronously starting the master unit and the slave unit, a solution for asynchronously starting a master unit and a slave unit is further provided according to the conventional technology.

In this solution, it is unnecessary to perform synchronization control by using an upper level controller and unnecessary to perform communication between the master unit and slave unit. For example, a maximum voltage Umax in starting a master unit is preset based on a historical load condition to avoid overload in starting of the master unit. The slave unit monitors the load voltage, and is started with the load voltage as a predetermined voltage. After a difference between the output voltage of the slave unit and the load voltage remains stable for a time period, a switch of the slave unit is turned on, so that the master unit and the slave unit are connected in parallel, and then the voltages of the master unit and the slave unit are increased simultaneously. Slave units are sequentially connected to the master unit in parallel until the voltage reaches a rated value. The solution has a problem that the load voltage is different from the predetermined voltage of the master unit, resulting in that the reactive power cannot be evenly distributed.

In order to solve the above technical problem, a method for starting a new energy power generation system in an off-grid mode and a new energy power generation system are provided according to the present disclosure. According to the present disclosure, the voltage of the master unit is increased based on a predetermined voltage. Each of the slave units determines a target predetermined voltage of the master unit by detecting a load voltage of the system. After the master unit determines that a slave unit is successfully connected to the master unit in parallel by monitoring the output current of the master unit, the master unit increases the output voltage until all the slave units are connected to the master unit in parallel and operate. Therefore, with the solution according to the present disclosure, it is unnecessary to perform upper level synchronization control and unnecessary to perform communication between the master unit and the slave units in the black starting process.

In order to make the objects, technical solutions and advantages of the embodiments of the present disclosure clearer, the technical solutions in the embodiments of the present disclosure are described clearly and completely in conjunction with the drawings of the embodiments of the present disclosure hereinafter. It is apparent that the described embodiments are only some rather than all embodiments of the present disclosure. Based on the embodiments of the present disclosure, all other embodiments obtained by those skilled in the art without any creative efforts fall within the protection scope of the present disclosure.

Figure 1:
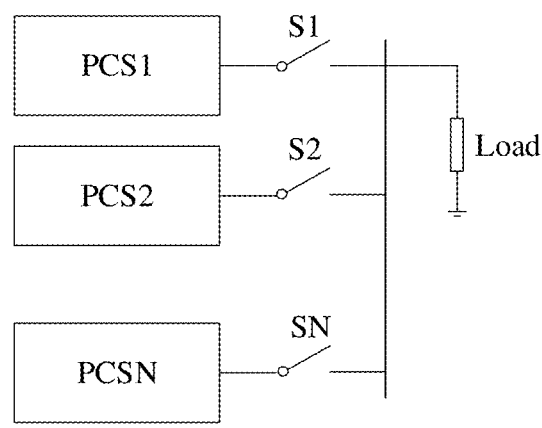
FIG. 1 is a topology diagram of a new energy power generation system in an off-grid mode.

Reference is made to FIG. 1, which shows a topology diagram of a new energy power generation system in an off-grid mode. A photovoltaic power generation system is taken as an example. As shown in FIG. 1, N power conversion systems (PCSs) are included. Each of the N power conversion systems is connected to an alternating current bus through a control switch S. The alternating current bus may be connected to a load.

The PCSs may control charging and discharging of a storage battery, perform alternating current/direct current conversion, and directly supply power to an alternating current load without a power grid.

One of the N PCSs may be configured as a master unit, and all the other PCSs may be configured as slave units. In addition, the master unit may be configured with N sequentially increasing predetermined voltages, and an N-th predetermined voltage is a rated predetermined voltage.

In performing black starting on the new energy power generation system, the master unit is controlled to be started first. In starting the master unit, the voltage of the master unit is increased based on the sequentially increasing predetermined voltages. For each of the slave units, the slave unit determines a predetermined voltage of the master unit by monitoring a load voltage, then the slave unit is started at a voltage equal to the predetermined voltage, and then the slave unit is connected to the master unit in parallel after the slave unit performs stable operation. The master unit determines that a slave unit is successfully connected to the master unit in parallel by monitoring an output current of the master unit, then the voltage of the master unit is increased, and the above operations is repeated until all the slave units are connected to the master unit in parallel and operate.

Hereinafter, a black starting process of a new energy power generation system is described in detail in conjunction with FIG. 2.

Figure 2:
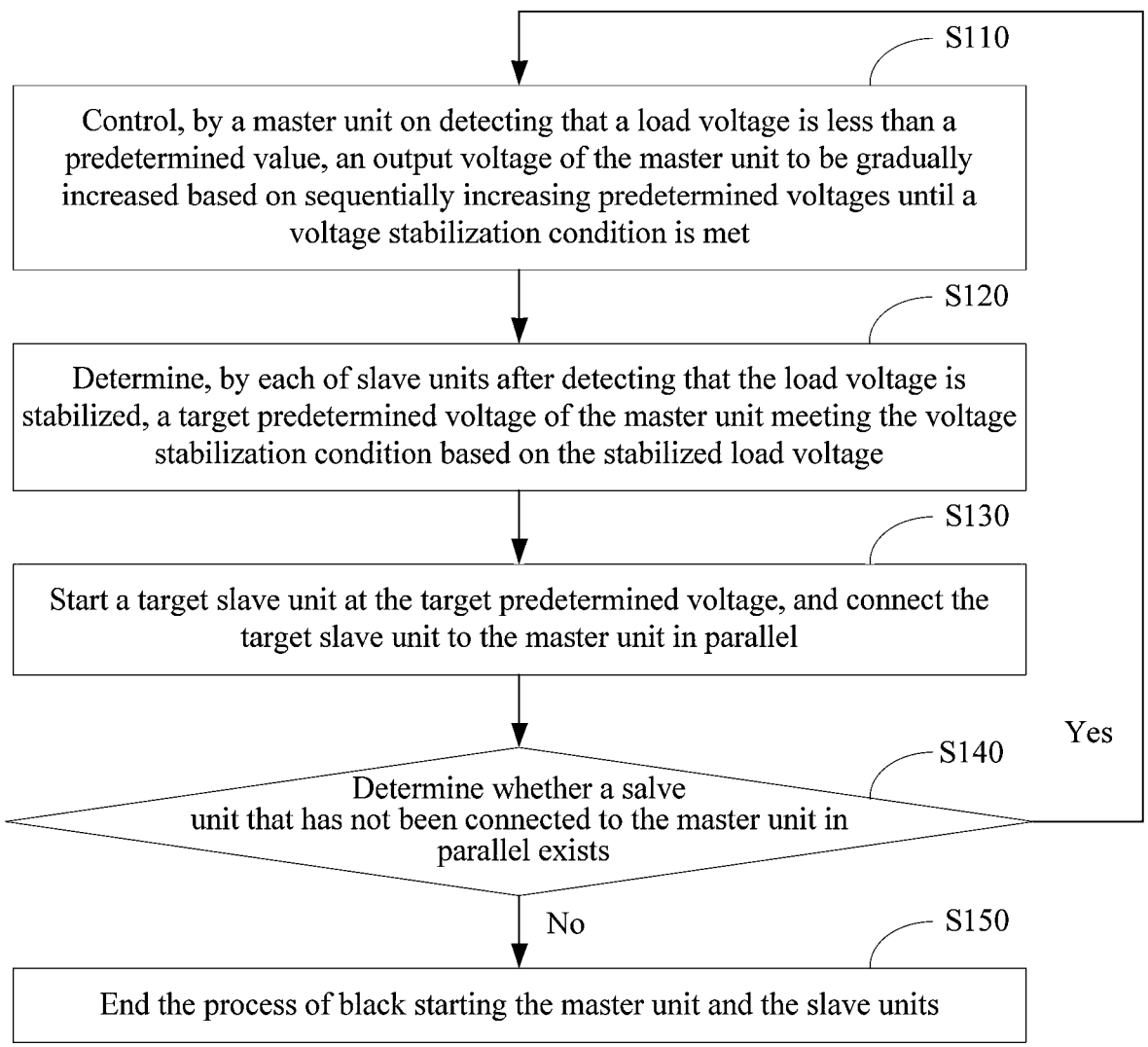
FIG. 2 is a flowchart of a method for starting a new energy power generation system in an off-grid mode according to an embodiment of the present disclosure.

Reference is made to FIG. 2, which shows a flowchart of a method for starting a new energy power generation system in an off-grid mode according to an embodiment of the present disclosure. The method includes the following steps S110 to S150.

In step S110, the master unit, on detecting that a load voltage is less than a predetermined value, controls an output voltage of the master unit to be gradually increased based on the sequentially increasing predetermined voltages until a voltage stabilization condition is met.

When the load voltage is less than the predetermined value, it indicates that the new energy power generation system is disconnected from a public power grid. That is, the new energy power generation system operates in an off-grid mode. Thus, it is required to start the new energy power generation system to supply power to a load.

The master unit is started first. The output voltage of the master unit is gradually increased based on the predetermined voltages until the output voltage of the master unit meets a voltage stabilization condition. Then, the output voltage of the master unit is controlled not to be increased by controlling the predetermined voltage not to be increased.

In an application scenario of the present disclosure, the voltage stabilization condition is a condition in which an increase of the output voltage of the master unit results in an overcurrent risk. Thus, a current predetermined voltage is kept unchanged, and the load voltage is stable. After detecting that the load voltage is stable, the slave unit is started with the current predetermined voltage of the master unit. After the slave unit is started and is connected to the master unit in parallel, an output current of the master unit is reduced.

In another application scenario of the present disclosure, the master unit has no overcurrent risk in a case that no load is arranged. Thus, the output voltage of the master unit may be gradually increased to the rated predetermined voltage, and all the slave units are not started. In this case, the voltage stabilization condition is a condition in which the output voltage of the master unit reaches the rated predetermined voltage.

In step S120, for each of the slave unit, after the slave unit detects that the load voltage is stabilized, the slave unit determines a target predetermined voltage of the master unit meeting the voltage stabilization condition based on the stabilized load voltage.

For each of the slave unit, the slave unit may detect whether the load voltage is stabilized in real time or at a time interval. After detecting that the load voltage is stabilized, the slave unit determines a predetermined voltage closest to the load voltage from the N predetermined voltages as a current predetermined voltage of the master unit, that is, the target predetermined voltage.

In step S130, a target slave unit is started at the target predetermined voltage, and is connected to the master unit in parallel.

An identification of the target slave unit matches an arrangement number of the target predetermined voltage in the predetermined voltages.

For each of the slave units, after the slave unit determines the target predetermined voltage of the master unit, the slave unit determines whether an identification of the slave unit matches the target predetermined voltage. In a case that the identification of the slave unit matches the target predetermined voltage, the slave unit determines that a starting condition is met. In a case that the identification of the slave unit does not match the target predetermined voltage, the slave unit determines that the starting condition is not met.

In an embodiment of the present disclosure, the master unit and the slave units are numbered. For example, the master unit is numbered as #1, and the slave units are sequentially numbered as #2 to #N. The target predetermined voltage of the master unit is an m-th predetermined voltage in the N predetermined voltages, and a slave unit having a number #(m+1) is the target slave unit.

In step S140, after determining that the target slave unit is successfully connected to the master unit in parallel by detecting an output current of the master unit, the master unit determines whether a slave unit not connected to the master unit in parallel exists. In a case that a slave unit not connected to the master unit in parallel exists, proceed to step S110. In a case that no slave unit not connected to the master unit in parallel exists, proceed to step S150.

The output current of the master unit is reduced after a slave unit is connected to the master unit in parallel. Therefore, the master unit may determine whether the target slave unit is successfully connected to the master unit in parallel by detecting a change of the output current $I_o$ of the master unit. In a case that the output current of the master unit is reduced, it is determined that the slave unit is successfully connected to the master unit in parallel. In a case that the output current of the master unit is not reduced, it is determined that the slave unit is not connected to the master unit in parallel.

In step S150, the black starting process of the master unit and the slave units ends.

In the method for starting a new energy power generation system in an off-grid mode according to the embodiment, the output voltage of the master unit is gradually increased based on multiple predetermined voltages. The slave units determine the target predetermined voltage of the master unit by detecting the load voltage of the system. After determining that a slave unit is successfully connected to the master unit in parallel by monitoring the output current of the master unit, the master unit increases the output voltage until all the slave units are connected to the master unit in parallel. Therefore, in the black starting process according to the present disclosure, it is unnecessary to perform the upper level synchronization control and is unnecessary to perform communication between the master unit and the slave units. In addition, in starting the slave units according to the present disclosure, only the slave unit (that is, the target slave unit), having an identification matching an arrangement number of the target predetermined voltage in the N predetermined voltages, is started at the target predetermined voltage and is connected to the master unit in parallel, ensuring that the slave units are started and connected to the master unit in parallel in an order, thereby avoiding that the slave units are started and connected to the master unit in parallel simultaneously.

Figure 3:
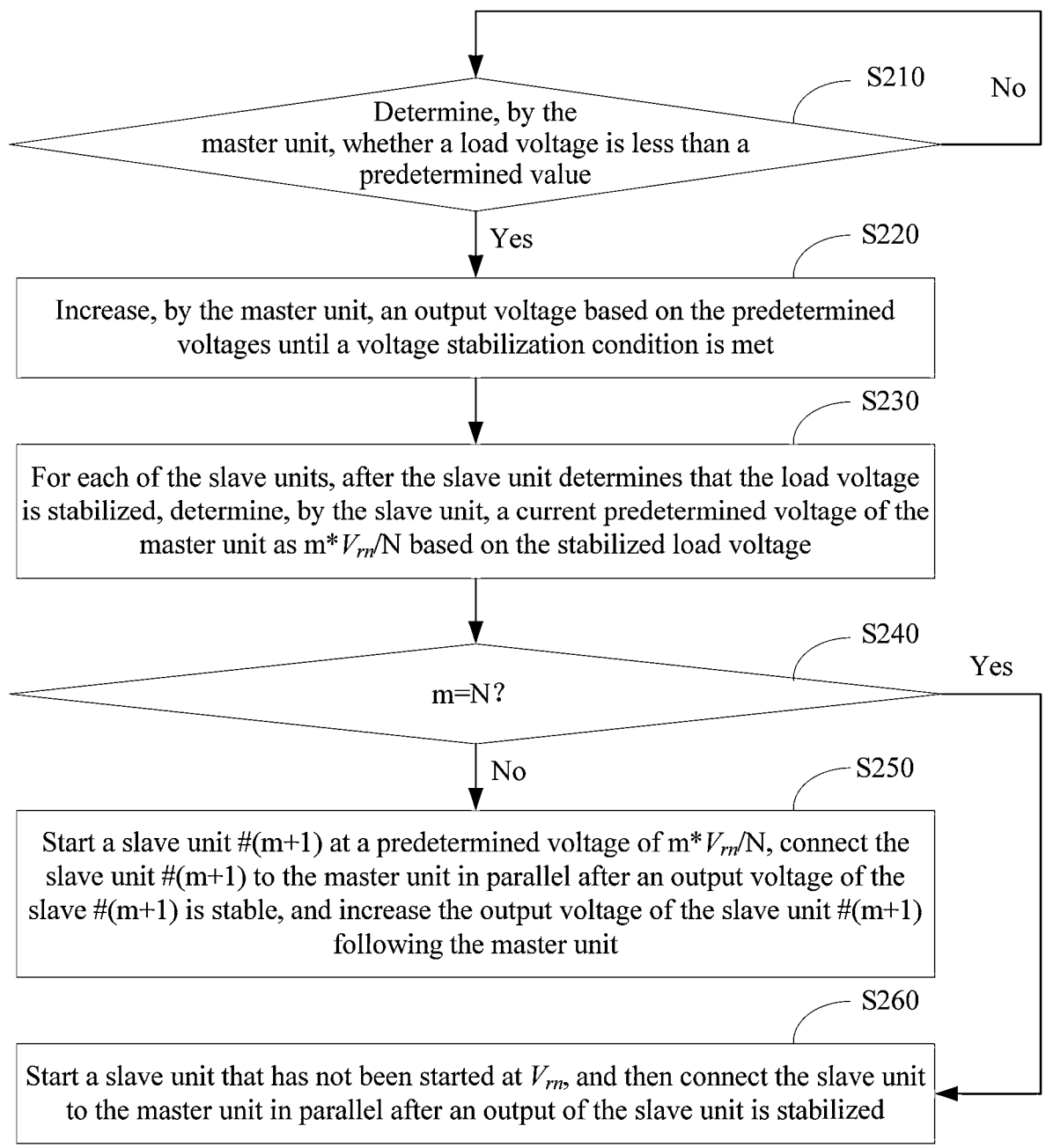
FIG. 3 is a flowchart of a method for starting a new energy power generation system in an off-grid mode according to another embodiment of the present disclosure.

Reference is made to FIG. 3, which shows a flowchart of a method for starting a new energy power generation system in an off-grid mode according to another embodiment of the present disclosure. In the embodiment, the N predetermined voltages of the master unit are obtained by N evenly dividing the rated predetermined voltage $V_{rn}$. That is, each of the predetermined voltages may be expressed as $iV_{rn}/N$, where $1 \leq i \leq N$, and an initial value of i is equal to 1.

As shown in FIG. 3, the method for starting a new energy power generation system in an off-grid mode according to the embodiment includes the following steps S210 to S260.

In step S210, the master unit determines whether a load voltage is less than a predetermined value. In a case that the load voltage is less than the predetermined value, proceed to step S220. In a case that the load voltage is not less than a predetermined value, proceed to step S210.

In step S220, the master unit increases an output voltage based on the predetermined voltages until a voltage stabilization condition is met.

The master unit controls the output voltage to be increased by increasing the predetermined voltage. For example, the predetermined voltage is increased by increasing i. The predetermined voltage is increased until the voltage stabilization condition is met, so that the output voltage of the master unit is gradually stabilized around a current predetermined voltage and the load voltage is equal to the output voltage of the master unit. Therefore, the load voltage is stabilized around the current predetermined voltage.

In step S230, for each of the slave units, after the slave unit determines that the load voltage is stabilized, the slave unit determines a current predetermined voltage of the master unit as $m^*V_{rn}/N$ based on the stabilized load voltage. "*" in the present disclosure represents a multiplication operation.

The load voltage is equal to the output voltage of the master unit and the output voltage of the master unit is controlled based on the current predetermined voltage, so that the load voltage is stabilized around the current predetermined voltage. After the load voltage is detected, a predetermined voltage closest to the load voltage, that is, the current predetermined voltage of the master unit, is determined from the N predetermined voltages.

In step S240, for each of the slave units, the slave unit determines whether m is equal to N. In a case that m is not equal to N, proceed to step S250. In a case that m is equal to N, proceed to step S260.

In step S250, a slave unit #(m+1) is started at a predetermined voltage $m^*V_{rn}/N$. The slave unit #(m+1) is connected to the master unit in parallel, an output voltage of the slave unit #(m+1) is increased with the output voltage of the master unit after the output voltage of the slave #(m+1) is stable, and then proceed to step S220.

For each of the slave units, the slave unit determines whether the number #n of the slave unit is equal to m+1. In a case that n is equal to m+1, it indicates that the slave unit meets a starting condition, and then the slave unit is started at a predetermined voltage of $m^*V_{rn}/N$. In a case that n is not equal to m+1, it indicates that the slave unit does not meet a starting condition.

After the slave unit #(m+1) is started and an output of the slave unit #(m+1) is stable, the master unit detects that the output current of the master unit is reduced, then the master unit increases the output voltage, and the slave unit #(m+1) increases the voltage with the master unit.

In step S260, a slave unit that has not been started is started at $V_{rn}$, and then is connected to the master unit in parallel after an output of the slave unit is stable.

In the method for starting a new energy power generation system in an off-grid mode according to the embodiment, the master unit increases the load voltage based on the multiple predetermined voltages. Each of the slave units determines the target predetermined voltage of the master unit by detecting the load voltage of the system, and is started at the target predetermined voltage. It can be seen that the predetermined voltages of the slave units are controlled to be the same as the predetermined voltage of the master unit without performing communication between the master unit and the slave units, evenly distributing the reactive power. After determining that the target slave unit is successfully connected to the master unit in parallel by detecting the output current of the master unit, the master unit increases the output voltage of the master unit, and the slave units that has been connected to the master unit in parallel increase voltages with the master unit, until all the slave units are connected to the master unit in parallel and operate. It can be seen from the above descriptions that in the black starting process according to the present disclosure, it is unnecessary to perform upper level synchronization control and unnecessary to perform communication between the master unit and the slave units, thereby reducing the system costs.

The processes of starting the master unit and starting the slave units are described in detail below in conjunction with FIG. 4.

Figure 4:
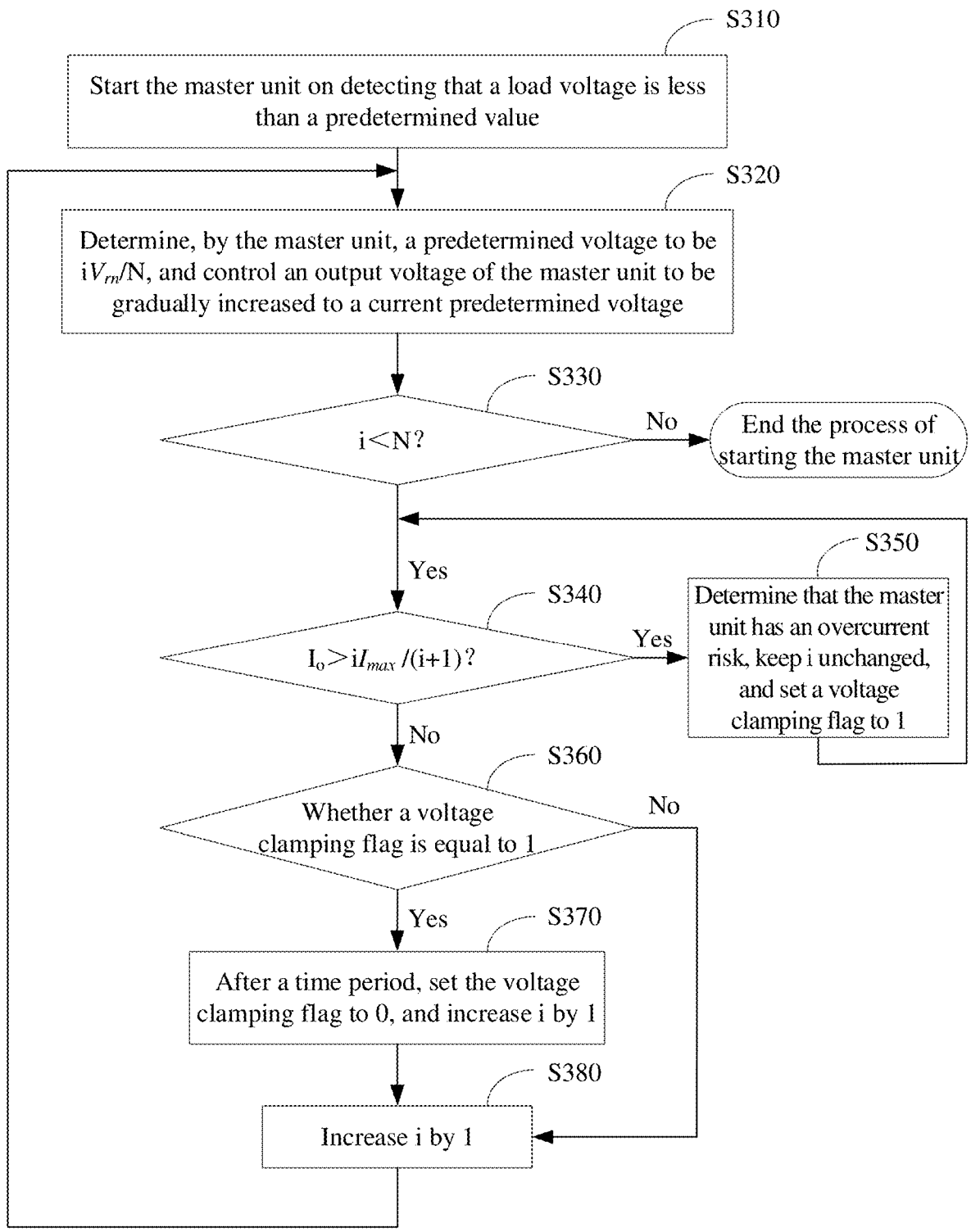
FIG. 4 is a flowchart of starting a master unit according to an embodiment of the present disclosure.

Reference is made to FIG. 4, which shows a flowchart of starting a master unit according to an embodiment of the present disclosure. As shown in FIG. 4, the process includes the following steps S310 to S380.

In step S310, the master unit, on detecting that a load voltage is less than a predetermined value, is started.

In step S320, the master unit determines a predetermined voltage to be $iV_{rn}/N$, and controls an output voltage of the master unit to be gradually increased to a current predetermined voltage.

An initial value of i is equal to 1. That is, the master unit is started at a predetermined voltage of $V_{rn}/N$.

In step S330, it is determined whether i is less than N. In a case that i is less than N, proceed to step S340; and in a case that i is not less than N, it is determined that the master unit is successfully started.

In the case that i is less than N, it indicates that the voltage of the master unit does not reach the rated predetermined voltage, and it is required to increase the output voltage of the master unit.

In a case that i is equal to N, it indicates that the predetermined voltage of the master unit reaches the rated predetermined voltage and it is determined that the master unit is successfully started.

In step S340, it is determined whether an output current $I_o$ is greater than $i^*I_{max}/(i+1)$. In a case that the output current $I_o$ is greater than $i^*I_{max}/(i+1)$, proceed to step S350. In a case that the output current $I_o$ is not greater than $i^*I_{max}/(i+1)$, proceed to step S360. $I_{max}$ represents a maximum current of the master unit, and may be configured to be slightly greater than a rated current.

In a case that $I_o$ is less than or equal to $i^*I_{max}/(i+1)$, it indicates that an increase of the voltage of the master does not cause an overcurrent risk.

In step S350, it is determined that the master unit has an overcurrent risk, i is kept unchanged, and a voltage clamping flag is set to 1.

In a case that $I_o$ is greater than $i*I_{max}/(i+1)$, it indicates that an overcurrent risk occurs when the voltage of the master unit is increased to $(i+1)V_{rn}/N$. Therefore, i is kept unchanged, that is, the predetermined voltage is not increased. In addition, the voltage clamping flag is set to 1, that is, flag=1, which indicates that the predetermined voltage is clamped by the current.

After step S350 is performed, proceed to step S340 after a time period.

In step S360, it is determined whether a voltage clamping flag is equal to 1. In a case that the voltage clamping flag is equal to 1, proceed to step S370. In a case that the voltage clamping flag is not equal to 1, proceed to step S380.

In the case of flag=1, it indicates that the predetermined voltage of the master unit is clamped, and the predetermined voltage is stabilized around $iV_{rn}/N$. Thus, the load voltage is stabilized around $iV_{rn}/N$. After detecting that the load voltage is stabilized, the slave unit is started at $iV_{rn}/N$, and then is connected to the master unit in parallel after an output of the slave unit is stable.

After the slave unit is connected to the master unit in parallel, the output current of the master unit is reduced since droop control is performed on the master unit and the slave units and the power is evenly distributed, and the master unit detects that $I_o$ is less than or equal to $i*I_{max}/(i+1)$. Therefore, $I_o \leq i*I_{max}/(i+1)$ and flag=1.

In step S370, after a time period, the voltage clamping flag is set to 0, and i is increased by 1, and then proceed to step S320.

After the master unit detects that $I_o \leq i*I_{max}/(i+1)$ and flag=1, it indicates that a slave unit is connected to the master unit in parallel. The above time period is configured for waiting for the current to be stable after the slave unit is connected to the master unit in parallel. After it is determined that the slave unit is successfully connected to the master unit in parallel, flag is set to 0, i is increased by 1, the predetermined voltage is increased, and the output voltage of the master unit is increased.

In step S380, i is increased by 1, and proceed to step S320.

In the case that $I_o \leq i*I_{max}/(i+1)$ and flag=0, it indicates that the output voltage of the master unit may be increased. Then, the load voltage is increased, and is not stable. Therefore, a voltage stabilization condition is not met.

Comparing with the starting method in which the predetermined voltage of the master unit is controlled to be increased in steps (that is, the predetermined voltage is increased to $V_{rn}/N$ firstly, and then is increased to $2V_{rn}/N$ after the slave unit #2 is connected to the master unit in parallel and the current is reduced, and then is increased to $3V_{rn}/N$ after the slave unit #3 is connected to the master unit in parallel and the current is reduced, . . . , until the slave unit #N is connected to the master unit in parallel), with the process of increasing the output voltage by clamping the predetermined voltage based on the output current in the embodiment, the predetermined voltage can reach the rated predetermined voltage quickly in a case of a small load. For example, the predetermined voltage of the master unit may be directly increased to the rated predetermined voltage in a case of no load.

In the process of starting the master unit in the embodiment, the predetermined voltage is clamped based on the output current. In a case that the output current of the master unit has an overcurrent risk, the predetermined voltage is clamped based on a current predetermined current, so that the predetermined voltage is not increased, That is, the load voltage is stabilized. Then, after the slave unit detects that the load voltage is stabilized, the slave unit is started at a predetermined voltage closest to the stabilized load voltage, thus the output current of the master unit is reduced, and then the output voltage of the master unit is increased. The above operations are repeated until all the slave units are started and connected to the master unit in parallel. In the embodiment, the predetermined voltage is clamped based on the current in starting of the master unit, accelerating the predetermined voltage to reach the rated predetermined voltage in a case of a small load, thereby improving the starting speed.

Figure 5:
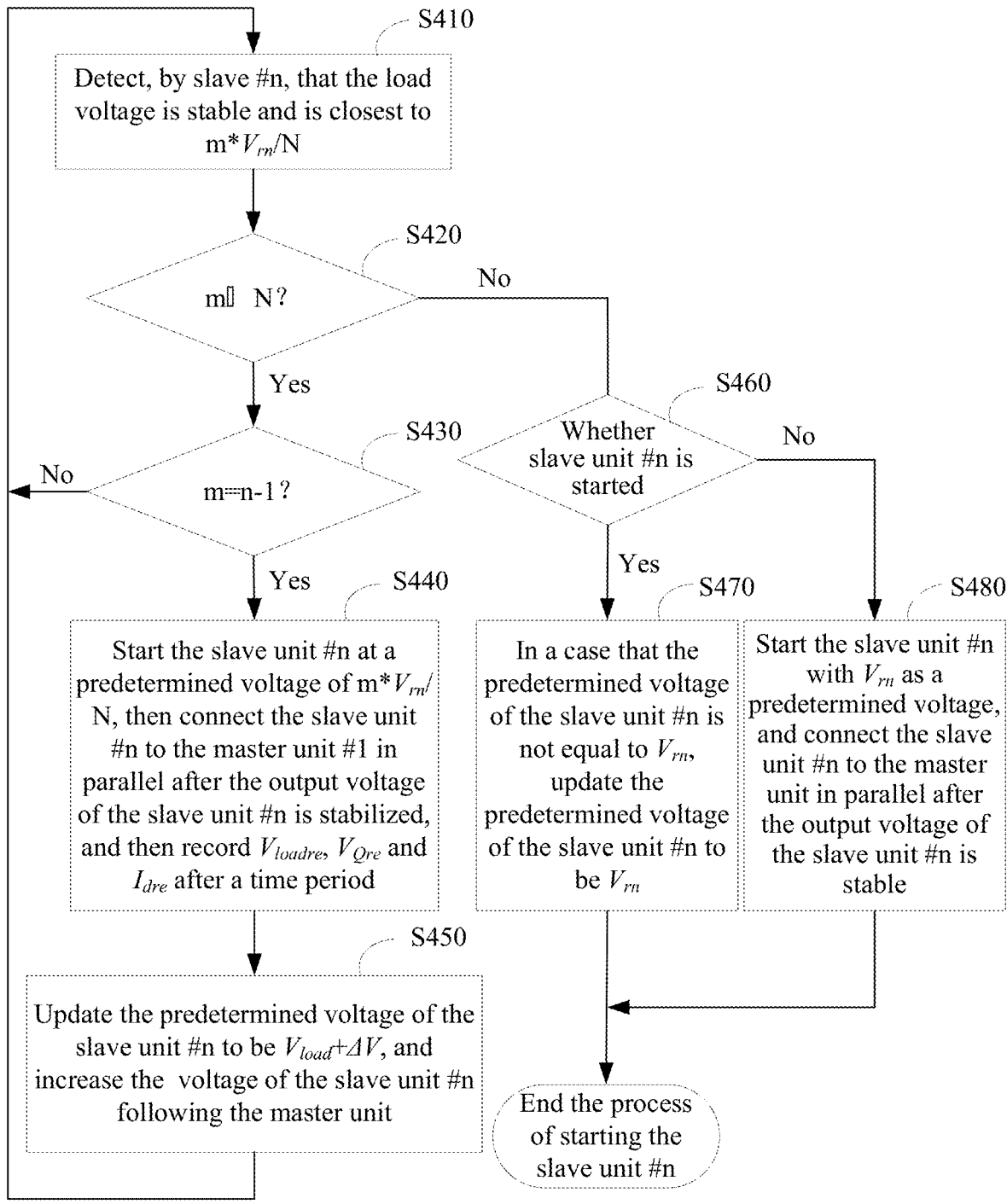
FIG. 5 is a flowchart of starting slave units according to an embodiment of the present disclosure.

Reference is made to FIG. 5, which shows a flowchart of starting slave units according to an embodiment of the present disclosure. In the embodiment, descriptions are provided by taking slave unit #n as an example, where n is a positive integer and $2 \leq n \leq N$.

In a case that a predetermined voltage of the slave unit is the same as a predetermined voltage of the master unit, a reactive power is evenly distributed based on droop control. Therefore, it is important for the slave unit to monitor the predetermined voltage of the master unit in increasing the voltage without performing communication with the master unit, ensuring evenly distributing the reactive power.

As shown in FIG. 5, the process of starting the slave unit #n includes the following steps S410 to S480.

In step S410, the slave unit #n detects that the load voltage is stable and is closest to $m*V_{rn}/N$, where n may be a positive integer within [2, N], m is a positive integer, and $1 < m \leq N$.

Each of the slave units stores the predetermined voltages of the master unit. The predetermined voltages are expressed as $i*V_{rn}/N$, where i is a positive integer within [1, n] and an initial value of i is equal to 1.

For each of the slave units, after detecting the load voltage, the slave unit compares the load voltage with each of the predetermined voltages of the master unit. In a case that a difference between a predetermined voltage $m*V_{rn}/N$ and the load voltage is less than or equal to a threshold $V_{oun}$, it is determined that the load voltage is stabilized.

In step S420, the slave unit #n determines whether m is less than N. In a case that m is less than N, proceed to step S430. In a case that m is not less than N, proceed to step S470.

In step S430, the slave unit #n determines whether m is equal to n−1. In a case that m is equal to n−1, proceed to step S440. In a case that m is not equal to n−1, proceed to step S410.

In the case that m is equal to n−1, it indicates that the slave unit #n meets a starting condition. In the case that m is not equal to n−1, it indicates that the slave unit #n does not meet a starting condition.

In an embodiment of the present disclosure, for each of the slave units, the slave unit determines whether a number n of the slave unit meet an equation of m=n−1 (that is, a target slave unit, having a number matching an arrangement number of a predetermined voltage of the master unit in the predetermined voltages, is started), thereby avoiding the slave units competing to be connected to the master unit in parallel.

For example, in a case that the load voltage is stabilized around $V_{rn}/N$, it indicates that the slave unit #2 is connected to the master unit in parallel; and in a case that the load voltage is stabilized around $2V_{rn}/N$, it indicates that the slave unit #3 is connected to the master unit in parallel. By analogy, in a case that the load voltage is stabilized around $m*V_{rn}/N (m<N)$, it indicates that the slave unit #(m+1) is connected to the master unit in parallel.

In step S440, the slave unit #n is started with a predetermined voltage of m*$V_{rn}$/N, and then is connected to the master unit #1 in parallel after the output voltage of the slave unit #n is stabilized. After a time period, a load voltage $V_{loadre}$, a voltage drop $V_{Qre}$ caused by droop control, and an active current $I_{dre}$ are recorded.

In step S450, the predetermined voltage of the slave unit #n is updated to $V_{load}+\Delta V$. After the output voltage of the master unit is increased, proceed to step S410. $\Delta V$ is calculated by using the following equation (1):

$$\Delta V = k_1(mV_{rn}/N - V_{loadre} - V_{Qre}) + k_1 k_2 V_{Qre} \quad (1)$$

where $k_1 = I_d/I_{dre}$, $k_2 = V_{load}/V_{loadre}$, $I_d$ represents a real-time active current, $V_{load}$ represents a real-time load voltage, $V_{rn}$ represents the rated predetermined voltage, and N represents a total number of the master unit and the slave units.

In increasing the voltage, a voltage drop caused by virtual impedance and an actual equivalent series resistance is proportional to the active current, the voltage drop caused by droop control is determined based on the reactive power, and the reactive power is equal to a product of the load voltage and the reactive current. If a power factor remains unchanged, a ratio of the reactive current to the active current remains unchanged. Therefore, the reactive power is proportional to the load voltage and the active current. Therefore, the above equation (1) is obtained.

In step S460, it is determined whether the slave unit #n is started. In a case that the slave unit #n is started, proceed to step S470. In a case that the slave unit #n is not started, proceed to step S480.

In step S470, in a case that the predetermined voltage of the slave unit #n is not equal to $V_{rn}$, the predetermined voltage of the slave unit #n is updated to be $V_{rn}$ In a case that m is equal to N and the slave unit #n has been started, the predetermined voltage of the slave unit #n is updated to be $V_{rn}$. Due to an estimation errors, the predetermined voltage of the slave unit #n may be slightly less than $V_{rn}$ in starting the slave unit #n, so that the predetermined voltage of the slave unit #n is updated to be $V_{rn}$, thereby ensuring that the predetermined voltage of the slave unit is the same as the predetermined voltage of the master unit.

In step S480, the slave unit #n is started with $V_{rn}$ as a predetermined voltage, and then is connected to the master unit in parallel after the voltage of the slave unit #n is stable.

In a case that m is equal to N and the slave unit #n is not started, the slave unit #n is started with $V_{rn}$ as a predetermined voltage. After the output voltage of the slave unit #n is stable, a control switch $S_n$ is turned on, and the process of starting the slave unit #n ends.

In order to reduce the possibility of multiple slave units are started simultaneously, each of the slave units is started and connected to the master unit in parallel after a time period after the slave unit determines that a starting condition for the slave unit is met. For different slave units, the time periods are different. For example, the time periods may be related to the numbers of the slave units. For example, a larger number indicates a longer time period, or, a large number indicates a shorter time period.

The process of starting a slave unit is descried below by taking N=2 as an example.

It is assumed that N=2, #1 represents a master unit, and #2 represents a slave unit. There are two cases when the voltage of the master unit is stable. In a first case of $V_{rn}/2$, the load voltage $V_{load}$ is stabilized around $V_{rn}/2$. In a second case of $V_{rn}$, $V_{load}$ is stabilized around $V_{rn}$.

On detecting that the load voltage $V_{load}$ is stabilized around $V_{rn}/2$, the slave unit is started with $V_{rn}/2$ as a predetermined voltage, and then the slave unit is connected to the master unit in parallel after the voltage of the slave unit is stabilized. After the current is stabilized, the slave unit records the load voltage $V_{loadre}$, a voltage drop $V_{Qre}$ caused by droop control, and an active current $I_{dre}$. Then, the predetermined voltage of the slave unit is updated to $V_{load}+\Delta V$, where $\Delta V$ is expressed as shown in the above equation (1). The slave unit waits for the master unit to increase the voltage. With the master unit increasing the voltage, the slave unit increases voltage until the voltage reaches a rated predetermined voltage $V_{rn}$. The starting process ends.

On detecting that the load voltage $V_{load}$ is stabilized around $V_{rn}$, the slave unit is started with $V_{rn}$ as a predetermined voltage. The slave unit is connected to the master unit in parallel after the output voltage of the slave unit is stabilized, and the process of starting the slave unit ends.

It should be noted that in a case that the load is not be added, the slave unit may not be started.

FIG. 6 to FIG. 10 show schematic diagrams of changes of a predetermined voltage of a master unit being started with different loads. Descriptions are provided by taking N=4 as an example.

Figure 6:
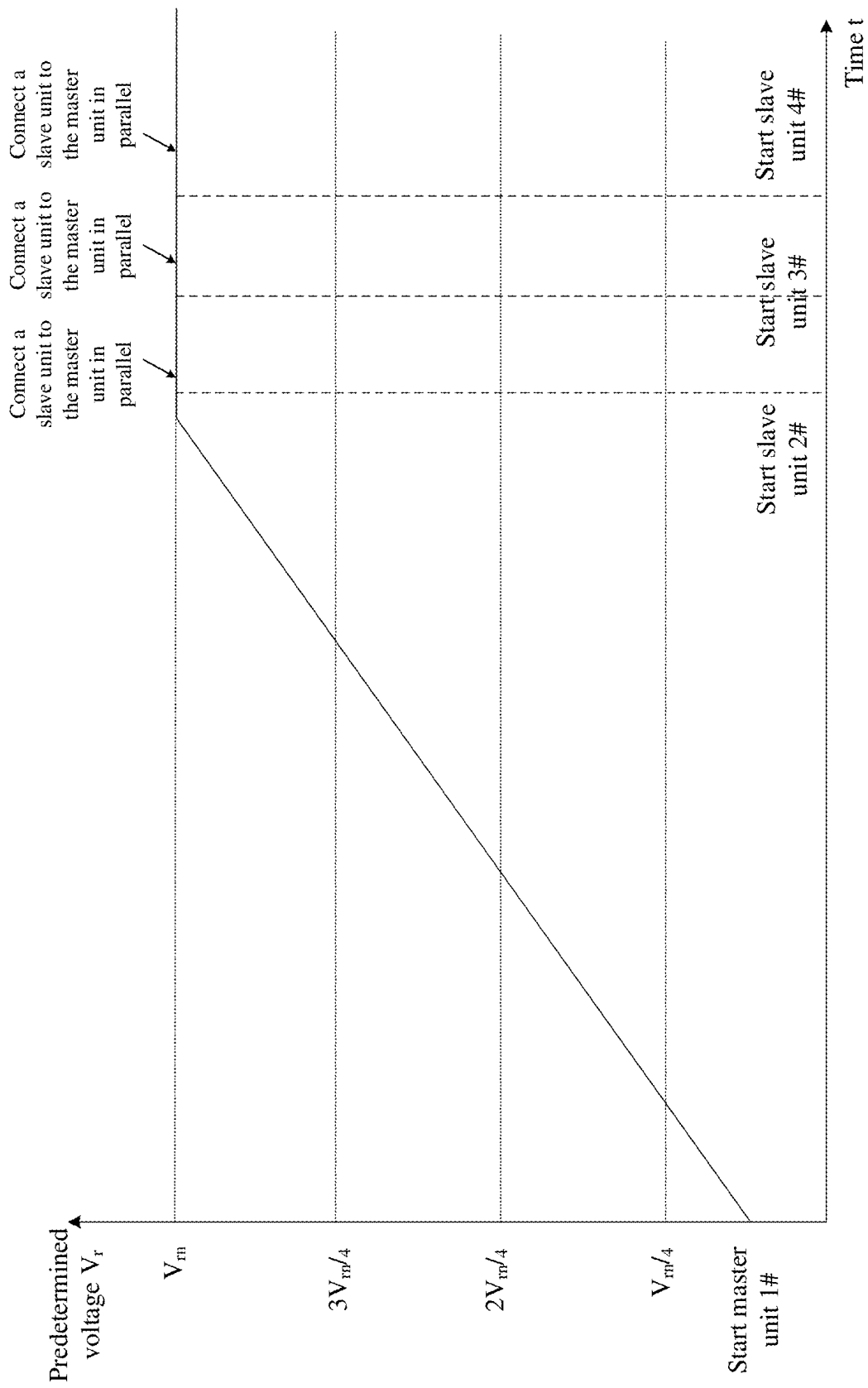
FIG. 6 to FIG. 10 are schematic diagrams showing changes of a predetermined voltage of a new energy power generation system started with different loads according to embodiments of the present disclosure.

As shown in FIG. 6, in a case of no load, an overcurrent risk does not occur on an output current of the master unit being started, so that the predetermined voltage of the master unit is increased to a rated predetermined voltage $V_{rn}$. Then, slave units that have not been started are started sequentially at the rated predetermined voltage.

Figure 7:
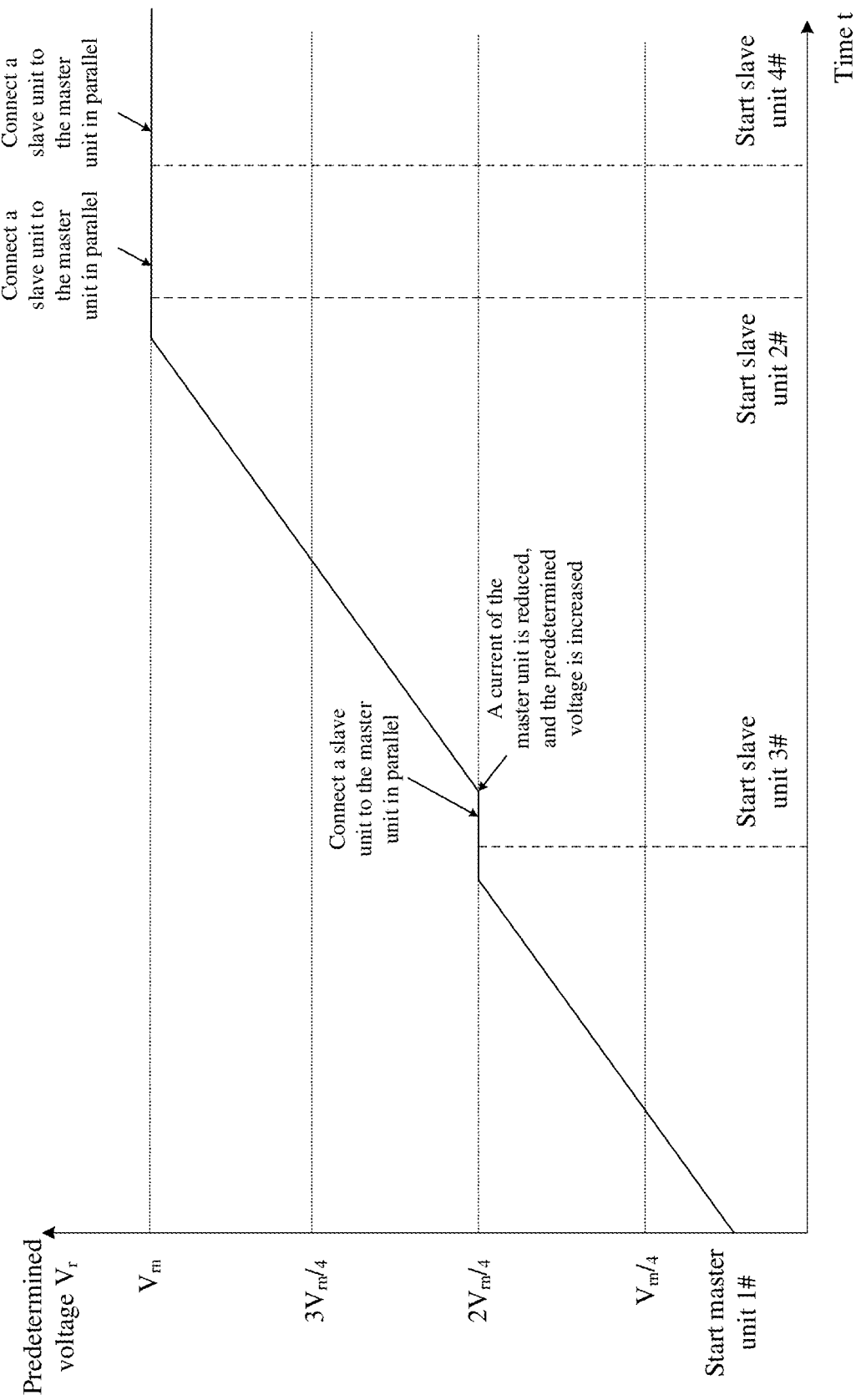

As shown in FIG. 7, in a case of a 40% rated load, the predetermined voltage of the master unit is increased and is stabilized at $2V_{rn}/4$, then the slave unit #3 is started. After the slave unit #3 is connected to the master unit in parallel, the current of the master unit is reduced. Then, the predetermined voltage of the master unit is increased, and the output voltage of the slave unit is increased following the master unit. When the predetermined voltage of the master unit reaches $V_{rn}$, the slave units #2 and #4 that have not been started are started sequentially with $V_{rn}$ as a predetermined voltage.

Figure 8:
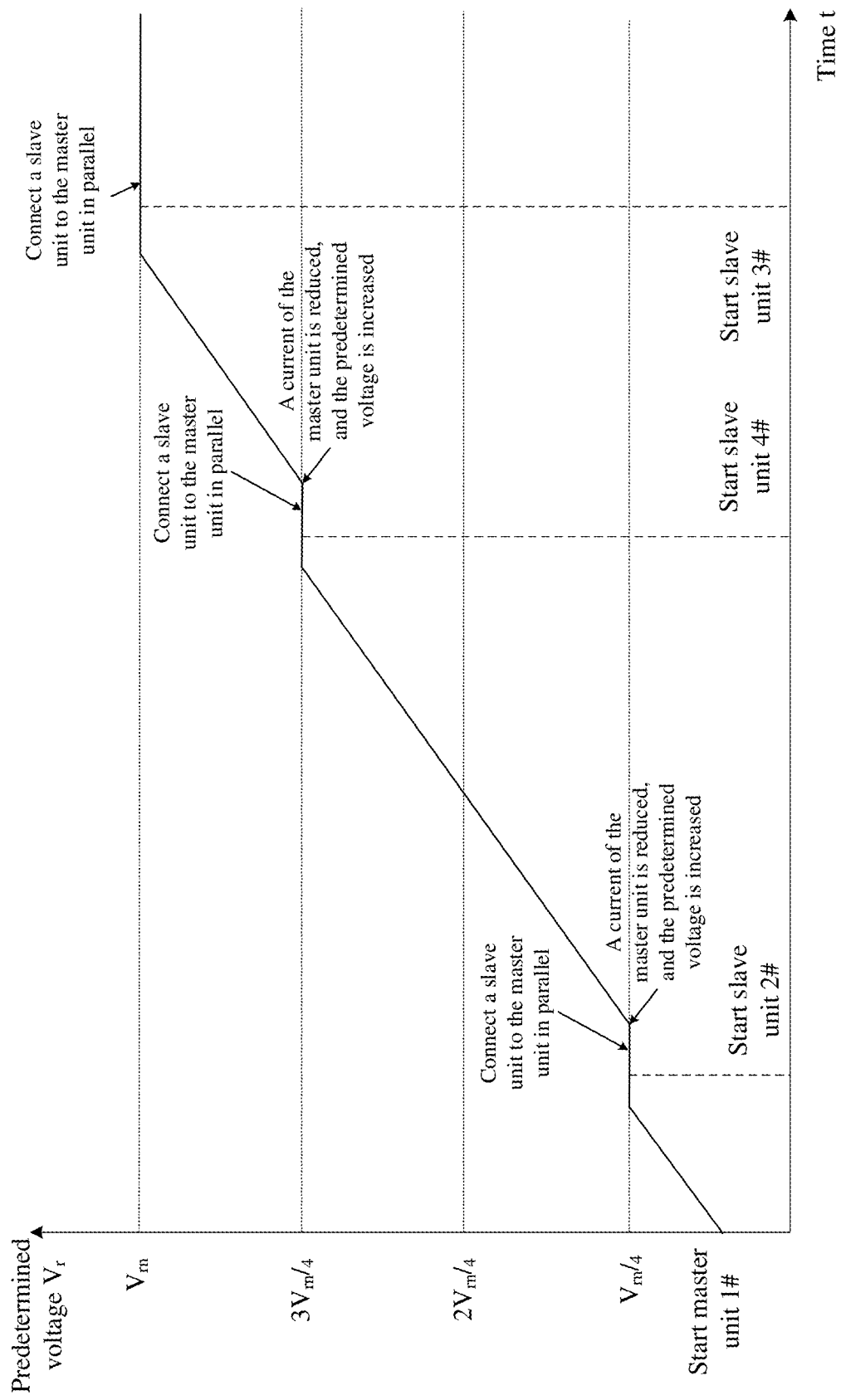

As shown in FIG. 8, in a case of a 60% rated load, the predetermined voltage of the master unit is increased and is stabilized at $V_{rn}/4$, then the slave unit #2 is started. After the slave unit #2 is connected to the master unit in parallel, the current of the master unit is reduced. Then, the predetermined voltage of the master unit is increased and is stabilized at $3V_{rn}/4$. Then, the slave unit #4 is started with $3V_{rn}/4$ as a predetermined voltage. After the slave unit #4 is connected to the master unit in parallel, the current of the master unit is reduced, and the voltage increase condition is met. The predetermined voltage of the master unit is increased and reaches $V_{rn}$. The slave unit #3 is started with $V_{rn}$ as a predetermined voltage.

Figure 9:
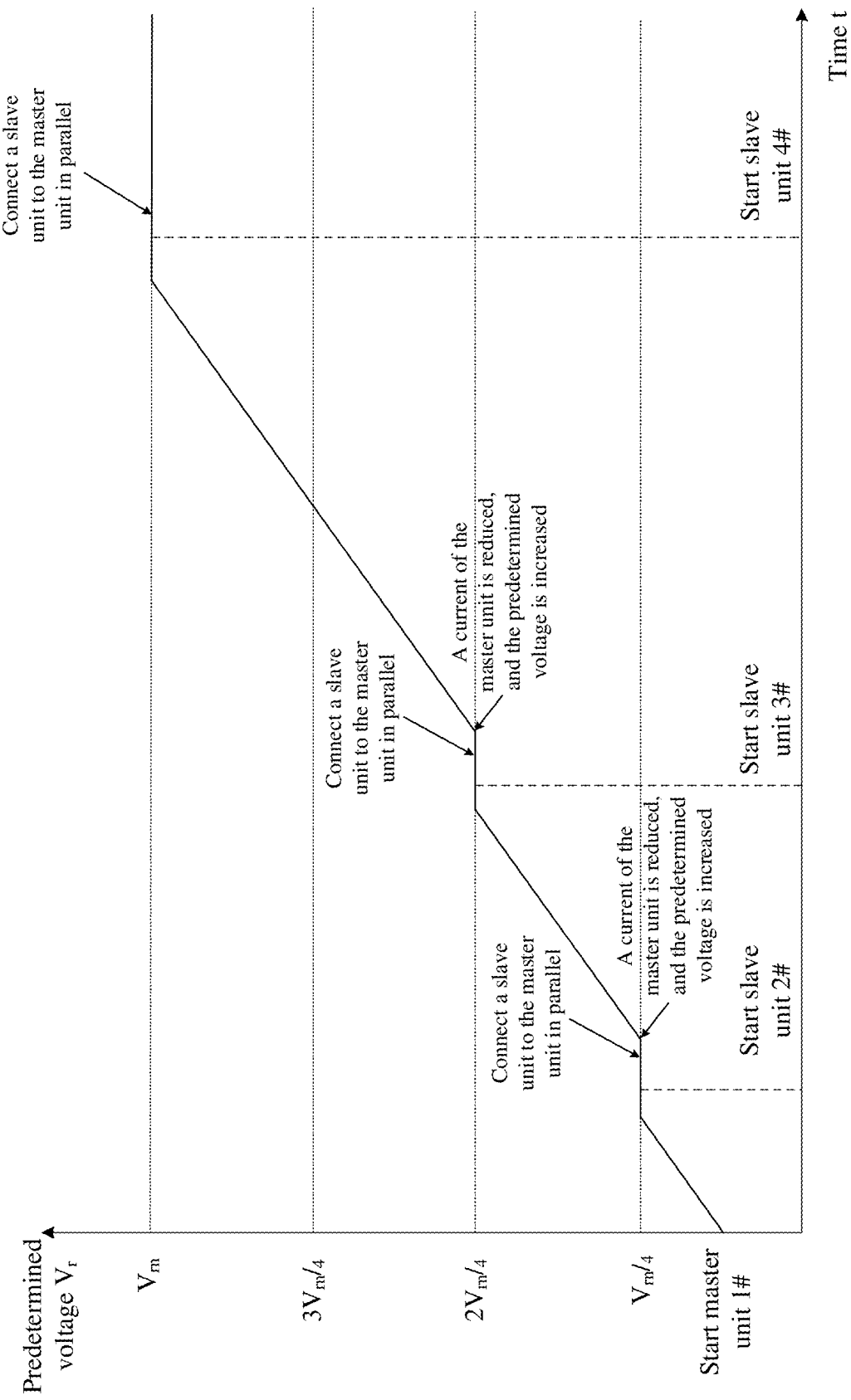

As shown in FIG. 9, in a case of a 70% rated load, the predetermined voltage of the master unit is increased and is stabilized at $V_{rn}/4$, then the slave unit #2 is started. Then, the predetermined voltage of the master unit is increased to $2V_{rn}/4$, and then the slave unit #3 is started. Then, the predetermined voltage of the master unit is increased to $V_{rn}$, and then the slave unit #4 is started.

Figure 10:
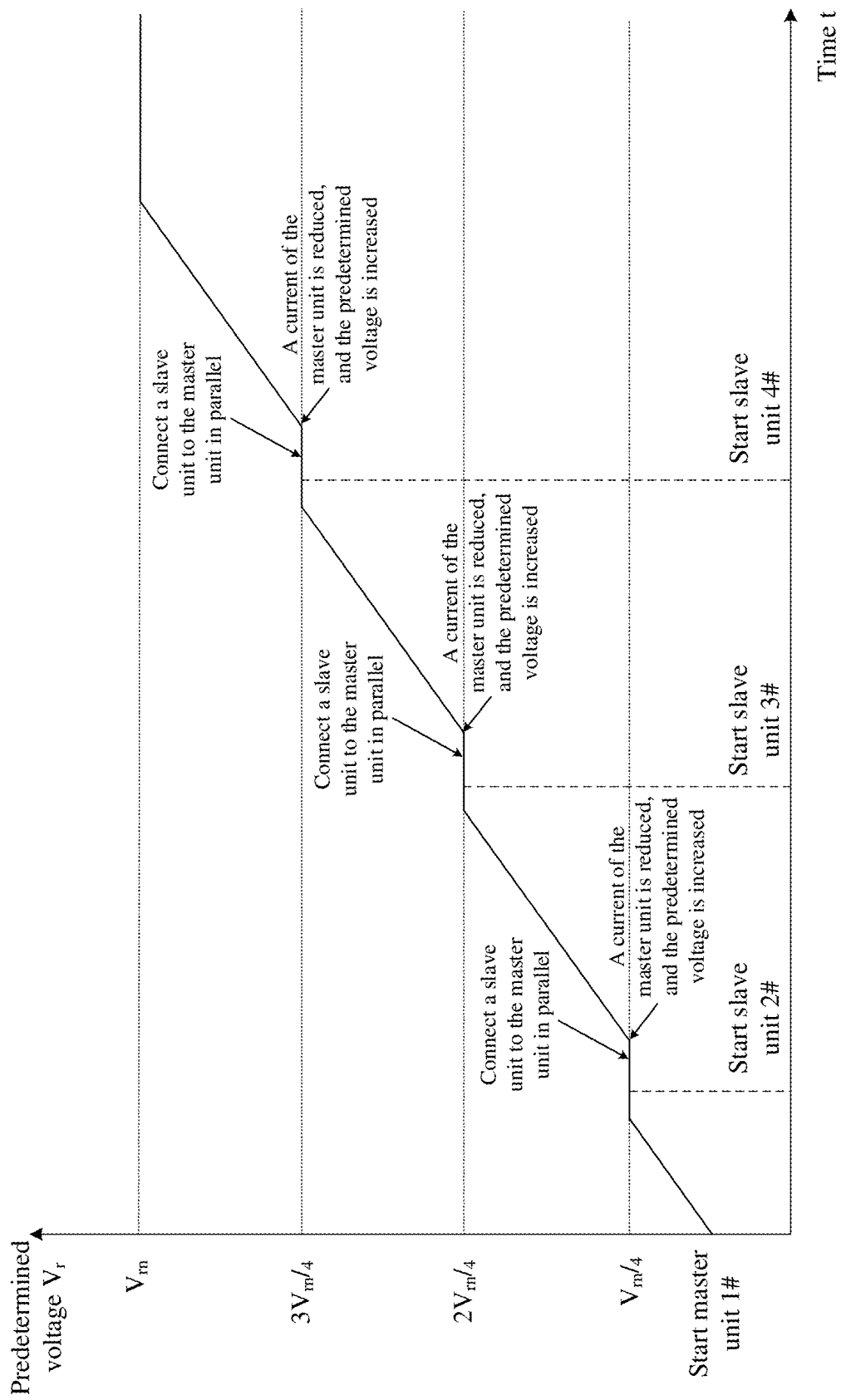

As shown in FIG. 10, in a case of a 100% rated load, the predetermined voltage of the master unit is increased and is stabilized at $V_{rn}/4$, then the slave unit #2 is started. Then, the slave #3 is started when the predetermined voltage of the master unit is increased to $2V_{rn}/4$. Then, the slave unit #4 is started when the predetermined voltage of the master unit is increased to $2V_m/4$. Then, the predetermined voltage of the master unit is increased to $V_m$, and all slave units increase voltages following the master unit.

Corresponding to the above method for starting a new energy power generation system in an off-grid mode, a new energy power generation system is further provided according to the present disclosure. The system includes one master unit and N−1 slave units, where N is a positive integer greater than 1. The master unit is configured with N sequentially increasing predetermined voltages, and an N-th predetermined voltage is a rated predetermined voltage.

The master unit is configured to be started according to the operations at the master unit side in the method for starting a new energy power generation system in an off-grid mode, and the slave units are configured to be started according to the operations at the slave unit side in the method for starting a new energy power generation system in an off-grid mode, which are not repeated herein.

In the method embodiments described above, the method is described as a combination of a series of steps for simplicity of the description. However, those skilled in the art should understand that the present disclosure is not limited to a described order of the steps. Some steps may be performed in other order or in parallel according to the present disclosure. In addition, those skilled in the art should also understand that the embodiments described in the specification are preferred embodiments, and the steps and modules described are not necessarily required by the present disclosure.

It should be noted that technical features in the embodiments of the present disclosure may be substituted for or combined with each other. Each of the embodiments emphasizes the differences from others, and the same or similar parts between the various embodiments can be referred to each other. Since the device disclosed in the embodiments is basically similar to the method therein, the description of the device is relatively simple, and for relevant matters, one may refer to the description of the method embodiments.

The steps in the method according to the embodiments of the present disclosure may be adjusted, merged or deleted according to actual needs.

The modules and sub-modules in the device and the terminal according to the embodiments of the present disclosure may be merged, divided or deleted according to actual needs.

In the embodiments according to the present disclosure, it should be understood that the disclosed terminal, device and method may be implemented in other means. For example, the terminal embodiment described above is only for illustration. For example, modules or sub-modules are divided only according to logical functions, and the modules or sub-modules may be divided in other manner in actual implementation. For example, multiple sub-modules or modules may be combined or integrated into another module, or some features may be ignored or not implemented. In addition, the shown or described mutual coupling, direct coupling, or communication connection may be indirect coupling or communication connection through some interfaces, devices or modules, which may be electrical, mechanical or in other form.

The modules or sub-modules described as separated components may be or may not be physically separated. Components described as modules or sub-modules may be or may not be physical modules or sub-modules. That is, the components may be arranged in one place, or may be distributed in multiple network modules or sub-modules. Some or all of the modules or sub-modules may be selected according to actual needs to realize the purpose of the solutions of the embodiments.

In addition, various functional modules or sub-modules in each embodiment of the present disclosure may be integrated in a processing module. Alternatively, the various functional modules or sub-modules may be physically separated. Alternatively, two or more modules or sub-modules may be integrated in one module. The above integrated modules or sub-modules can be implemented as hardware, software function modules or sub-modules.

It should be noted that the relational terms "first", "second" and the like in the description are used for distinguishing an entity or operation from another entity or operation, but not intended to require or imply an actual relationship or order between these entities or operations. Moreover, the terms "comprise", "include", or any other variants thereof are intended to encompass a non-exclusive inclusion, such that the process, method, article, or device including a series of elements includes not only those elements but also those elements that are not explicitly listed, or the elements that are inherent to such process, method, article, or device. Unless explicitly limited, the statement "including a . . . " does not exclude the case that other similar elements may exist in the process, the method, the article or the device other than enumerated elements.

With the description of the embodiments disclosed above, those skilled in the art can implement or use the technical solutions of the present disclosure. Various modifications to the embodiments are apparent to those skilled in the art. The general principle defined herein may be implemented in other embodiments without departing from the spirit or scope of the present application. Therefore, the present disclosure is not limited to these embodiments described herein, but in accordance with the widest scope consistent with the principle and novel features disclosed herein.

The above mentioned are only the preferred embodiments of the present disclosure. It should be pointed out that for those of ordinary skill in the art, several improvements and modifications can be made without departing from the principle of the present disclosure, and these improvements and modifications should also be regarded to fall within the protection scope of the present disclosure.

The invention claimed is:

1. A method for starting a new energy power generation system in an off-grid mode, wherein the new energy power generation system comprises one master unit and N−1 slave units, N is a positive integer greater than 1, the master unit is configured with N sequentially increasing predetermined voltages, and an N-th predetermined voltage is a rated predetermined voltage, wherein the method comprises:
   controlling, by the master unit on detecting that a load voltage is less than a predetermined value, an output voltage of the master unit to be gradually increased based on the sequentially increasing predetermined voltages until a voltage stabilization condition is met, wherein the voltage stabilization condition comprises a condition in which the master unit has an overcurrent risk or a condition in which the output voltage of the master unit reaches the rated predetermined voltage;
   determining, by each of the slave units after detecting that the load voltage is stabilized, a target predetermined voltage of the master unit meeting the voltage stabilization condition based on the stabilized load voltage;
   starting a target slave unit with the target predetermined voltage as a predetermined voltage, and connecting the target slave unit to the master unit in parallel, wherein an identification of the target slave unit matches an arrangement number of the target predetermined voltage in the predetermined voltages; and controlling, by the master unit after determining that the target slave unit is successfully connected to the master unit in parallel by detecting an output current of the master unit, the output voltage of the master unit to be gradually increased based on the sequentially increasing predetermined voltages until the voltage stabilization condition is met, until all the slave units are connected to the master unit in parallel and operate;

wherein the controlling, by the master unit on detecting that a load voltage is less than a predetermined value, an output voltage of the master unit to be gradually increased based on the sequentially increasing predetermined voltages until a voltage stabilization condition is met comprises:

controlling, by the master unit on detecting that the load voltage is less than the predetermined value, the output voltage of the master unit to be gradually increased based on the predetermined voltages;

determining, when a predetermined voltage of the master unit is increased to an i-th predetermined voltage and i is less than N, whether the master unit has an overcurrent risk based on the output current of the master unit, wherein i is a positive integer, 1≤i≤N, N represents a total number of the master unit and the slave units, and the N-th predetermined voltage is the rated predetermined voltage;

in a case that the master unit has the overcurrent risk, determining that the voltage stabilization condition is met; and in a case the master unit does not have the overcurrent risk, updating the predetermined voltage of the master unit to be an (i+1)th predetermined voltage, and controlling the output voltage of the master unit to be gradually increased based on the predetermined voltages.

2. The method according to claim 1, wherein the determining, when a predetermined voltage of the master unit is increased to an i-th predetermined voltage and i is less than N, whether the master unit has an overcurrent risk based on the output current of the master unit comprises:

determining, when the predetermined voltage of the master unit is increased to the i-th predetermined voltage and i is less than N, whether the output current $I_o$ of the master unit is greater than $i*I_{max}/(i+1)$, wherein $I_{max}$ represents a maximum current of the master unit; and in a case that $I_o$ is greater than $i*I_{max}/(i+1)$, determining that the master unit has the overcurrent risk, keeping i unchanged, and configuring a voltage clamping flag to be a predetermined clamping character indicating that the predetermined voltage is in a clamped state.

3. The method according to claim 2, wherein the master unit determining that the target slave unit is successfully connected to the master unit in parallel by detecting an output current of the master unit comprises:

determining, by the master unit on detecting that the output current $I_o$ of the master unit is less than or equal to $i*I_{max}/(i+1)$, whether the voltage clamping flag is the predetermined clamping character;

in a case that the voltage clamping flag is a predetermined non-clamping character, updating the predetermined voltage of the master unit to be the (i+1)th predetermined voltage, and controlling the output voltage of the master unit to be gradually increased based on the predetermined voltages; and in a case that the voltage clamping flag is the predetermined clamping character, determining that the target slave unit is successfully connected to the master unit in parallel, configuring the voltage clamping flag to be the predetermined non-clamping character after a predetermined time period, updating the predetermined voltage of the master unit to be the (i+1)th predetermined voltage, and controlling the output voltage of the master unit to be gradually increased based on the predetermined voltages.

4. The method according to claim 3, wherein the predetermined clamping character is 1 and the predetermined non-clamping character is 0.

5. The method according to claim 1, wherein the N predetermined voltages are obtained by N evenly dividing the rated predetermined voltage, the i-th predetermined voltage is equal to $i*V_{rn}/N$, i is a positive integer and 1≤i<N, and $V_{rn}$ represents the rated predetermined voltage.

6. The method according to claim 1, wherein the determining, by each of the slave units after detecting that the load voltage is stabilized, a target predetermined voltage of the master unit meeting the voltage stabilization condition based on the stabilized load voltage comprises:

for each of the slave unit, determining, by the slave unit after detecting that a change of the load voltage within a predetermined time period is less than a first voltage threshold, that the load voltage is stabilized; and determining, by the slave unit, a predetermined voltage closest to the stabilized load voltage from the predetermined voltages of the master unit as the target predetermined voltage, wherein the slave unit stores the predetermined voltages of the master unit.

7. The method according to claim 1, wherein the starting the target slave unit with the target predetermined voltage as a predetermined voltage and connecting the target slave unit to the master unit in parallel comprises:

in a case that the identification of the slave unit matches the arrangement number of the target predetermined voltage in the predetermined voltages of the master unit, determining the slave unit as the target slave unit that meets a starting condition;

in a case that the target slave units detects that the target predetermined voltage is not equal to the rated predetermined voltage, obtaining a load voltage $V_{loadre}$, an active current $I_{dre}$ and a voltage drop $V_{Qre}$ caused by an reactive power while the target slave unit is connected to the master unit in parallel and stable; and calculating a predetermined voltage correction value ΔV by using the following equation based on the load voltage, a real-time active current and the voltage drop caused by the reactive power:

$$\Delta V = k_1(mV_{rn}/N - V_{loadre} - V_{Qre}) + k_1 k_2 V_{Qre}$$

where $mV_{rn}/N$ represents the target predetermined voltage of the master unit, $k_1 = I_d/I_{dre}$, $k_2 = V_{load}/V_{loadre}$, $I_d$ represents the real-time active current, $V_{load}$ represents a real-time load voltage of the new energy power generation system; and updating, by the target salve unit, the predetermined voltage to be $V_{load} + \Delta V$, and controlling, by the target slave unit, a output voltage of the target slave unit based on the updated predetermined voltage.

8. The method according to claim 1, wherein the starting the target slave unit with the target predetermined voltage as a predetermined voltage and connecting the target slave unit to the master unit in parallel comprises:

in a case that the target slave unit detects that the target predetermined voltage is equal to the rated predetermined voltage and at least two slave units are not started, for each of the at least two slave units, starting the slave unit at the rated predetermined voltage after a predetermined time period and connecting the slave unit to the master unit in parallel, wherein the preset time period matches an identification of the slave unit.

9. A new energy power generation system, comprising one master unit and N−1 slave units, wherein N is a positive integer greater than 1, the master unit is configured with N sequentially increasing predetermined voltages, and an N-th predetermined voltage is a rated predetermined voltage, wherein the master unit is configured to control, on detecting that a load voltage is less than a predetermined value, an output voltage of the master unit to be gradually increased based on the sequentially increasing predetermined voltages until a voltage stabilization condition is met, wherein the voltage stabilization condition comprises a condition in which the master unit has an overcurrent risk or a condition in which the output voltage of the master unit reaches the rated predetermined voltage;

each of the slave unit is configured to determine, after detecting that the load voltage is stabilized, a target predetermined voltage of the master unit meeting the voltage stabilization condition based on the stabilized load voltage;

a target slave unit is configured to be started with the target predetermined voltage as a predetermined voltage and to be connected to the master unit in parallel, wherein an identification of the target slave unit matches an arrangement number of the target predetermined voltage in the predetermined voltages; and the master unit is further configured to, after determining that the target slave unit is successfully connected to the master unit in parallel by detecting an output current of the master unit, control the output voltage of the master unit to be gradually increased based on the sequentially increasing predetermined voltages until the voltage stabilization condition is met, until all the slave units are connected to the master unit in parallel and operate;

wherein the master unit is further configured to control, on detecting that the load voltage is less than the predetermined value, the output voltage of the master unit to be gradually increased based on the sequentially increasing predetermined voltages until the voltage stabilization condition is met by:

controlling the output voltage of the master unit to be gradually increased based on the predetermined voltages;

determining, when a predetermined voltage of the master unit is increased to an i-th predetermined voltage and i is less than N, whether the master unit has an overcurrent risk based on the output current of the master unit, wherein i is a positive integer, 1≤i≤N, N represents a total number of the master unit and the slave units, and the N-th predetermined voltage is the rated predetermined voltage;

in a case that the master unit has the overcurrent risk, determining that the voltage stabilization condition is met; and in a case the master unit does not have the overcurrent risk, updating the predetermined voltage of the master unit to be an (i+1)th predetermined voltage, and controlling the output voltage of the master unit to be gradually increased based on the predetermined voltages.

* * * * *

UNITED STATES PATENT AND TRADEMARK OFFICE
CERTIFICATE OF CORRECTION

| | | |
|---|---|---|
| PATENT NO. | : 12,334,732 B2 | Page 1 of 1 |
| APPLICATION NO. | : 18/273006 | |
| DATED | : June 17, 2025 | |
| INVENTOR(S) | : Xing Li et al. | |

It is certified that error appears in the above-identified patent and that said Letters Patent is hereby corrected as shown below:

In the Claims

At Column 18, Line 17 please delete "$1 \leq i < N$" and insert -- $1 \leq i \leq N$ --

Signed and Sealed this
Nineteenth Day of August, 2025

Coke Morgan Stewart
*Acting Director of the United States Patent and Trademark Office*